Jan. 29, 1963 A. B. STAFFORD 3,075,538
PRESSURE SUPPLY GAUGE
Filed June 30, 1961
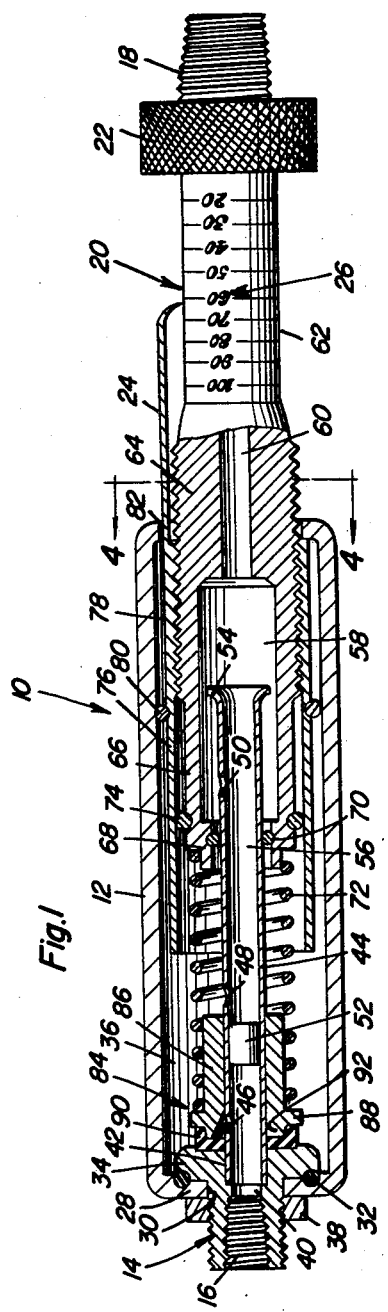
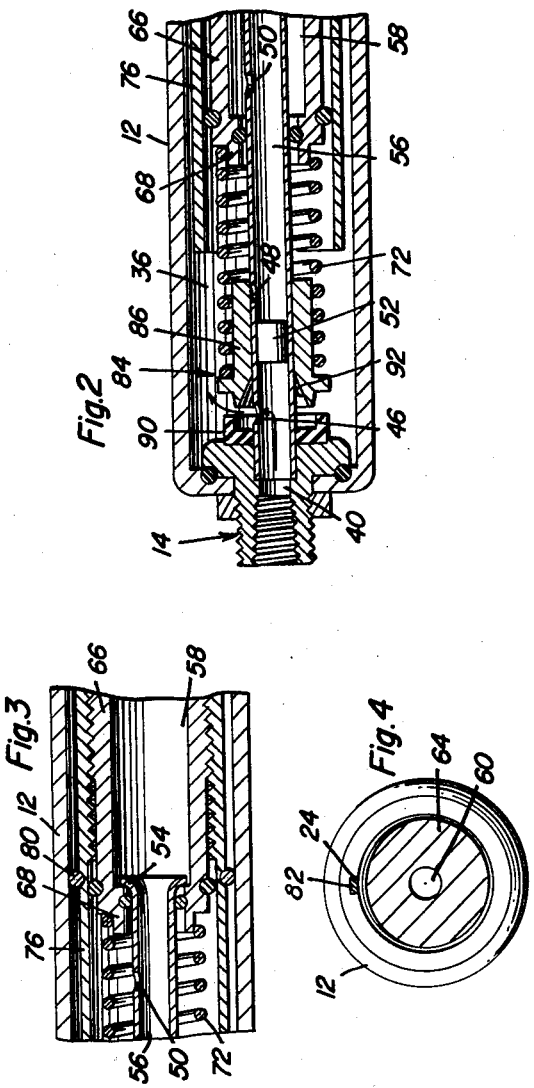
Alton Brooks Stafford
INVENTOR.
BY

United States Patent Office 3,075,538
Patented Jan. 29, 1963

3,075,538
PRESSURE SUPPLY GAUGE
Alton Brooks Stafford, % R. and D. Products,
Vanceburg, Ky.
Filed June 30, 1961, Ser. No. 121,194
14 Claims. (Cl. 137—224.5)

This invention relates to pressure control gauges for regulating the pressure supply to an outlet from a high pressure source and more particularly, to a pressure regulating gauge for tire inflation purposes.

It is therefore a primary object of the present invention to provide an in-line pressure gauge between a high pressure supply tank and the nozzle device or air chuck through which a pneumatic tire may be inflated. The pressure gauge of the present invention differs from gauges heretofore used, in that it is more rugged and less subjected to wear and damage because of fewer moving parts.

Another object of this invention is to provide an inflation pressure gauge for pneumatic tires or the like in which there are no ported valves or diaphragms that are susceptible to wear and damage rendering the gauge either inoperative or inaccurate.

A further object of this invention is to provide an inflation pressure gauge that may be constructed with unexpected economy and that is more reliable for extended use and operation.

An additional object of this invention is to provide an inflation pressure gauge which is accurately adjustable at different tire inflation pressure settings including a limit setting at which the pressure supply tank is directly connected to the tire, operation of the inflation pressure gauge otherwise involving a pulsating action to intermittently increase the tire pressure to the desired inflation value.

These together with other objects and advantages which will become subsequently apparent reside in the details of constructiton and operation as more fully hereinafter described and claimed, reference being had to the accompanying drawings forming a part hereof, wherein like numerals refer to like parts throughout, and in which:

FIGURE 1 is a longitudinal sectional view through the inflation pressure gauge of the present invention, illustrated in one operative condition.

FIGURE 2 is a partial sectional view of the inflation pressure gauge illustrated in its other operative position.

FIGURE 3 is a sectional view taken substantially through a plane indicated by section line 3—3 in FIGURE 1.

FIGURE 4 is a partial sectional view showing a portion of the inflation gauge in one limit setting thereof.

Referring now to the drawings in detail, the inflation pressure gauge is more completely illustrated in FIGURE 1 and is generally referred to by reference numeral 10. The gauge 10 includes an outer tubular shell member generally referred to by reference numeral 12. It will be apparent, to those skilled in the art, that the pressure gauge 10 is installed between a pressure air hose connected to a supply tank and the air chuck device by means of which the air pressure is applied to the inlet valve of a pneumatic tire. Accordingly, the gauge device 10 is provided at one end thereof with a pressure inlet stem 14 having an internally threaded portion 16 by means of which the device 10 may be coupled to the air pressure hose from the supply tank. The opposite end of the gauge 10 is provided with an externally threaded nipple 18 for attachment by some fluid type coupling to the air chuck. The nipple 18 is formed on the end of a pressure regulating outlet member 20 which has a knurled control knob 22 fixed thereto to effect axial adjustment of the outlet member 20 by rotation thereof relative to the tubular shell member 12. A pointer member 24 therefore extends axially outward from the tubular shell member 12 into cooperative relation to the pressure indicating indicia 26 that is mounted on the outlet control member 20 to indicate the inflation control pressure setting of the gauge 10.

The shell member 12 includes at one axial end thereof a wall portion 28 having an opening 30 through which the pressure inlet stem 14 is received. The wall 28 therefore provides a seat for an O-ring sealing member 32 which is also seated within an annular recess formed in a flange portion 34 of the pressure inlet stem 14, which flange portion 34 is disposed within a control pressure chamber 36 formed within the tubular shell member 12. The pressure inlet stem 14 is maintained in assembled fluid-tight position by means of the locking nut member 38 disposed on the outside of the end wall member 28 in abutment therewith and threadedly engaging the external threads on the pressure inlet stem 14. The stem 14 is therefore provided with an inlet passage 40 having an enlarged bore portion 42 for fixedly receiving therewithin one axial end of an outlet tube member 44.

The outlet tube member 44 extends through the control pressure chamber in coaxial relation to the shell member 12. The tube 44 is therefore provided with a plurality of ports including an inlet port 46, a chamber port 48 and an outlet port 50. The inlet and chamber ports are separated by a passage blocking member 52 mounted within the tubular passage member 44 so that fluid communication between the inlet passage 40 and the chamber port 48 is blocked. The chamber port 48 however as illustrated in FIGURE 1, will be in communication with the control pressure chamber 36. The outlet port 50 on the other hand which is adjacent to the end 54 of the outlet passage tube 44, will as illustrated in FIGURE 1, be in communication with the pressure control chamber 36 only through the chamber port 48 and the passage 56 formed within the tube 44. The outlet port 50 therefore provides communication between the control pressure chamber 36 and the enlarged bore portion 58 of an outlet passage 60 formed within the control pressure outlet member 20.

The control pressure outlet member 20 in addition to the portions 62 to which the control knob 24 and outlet nipple 18 are connected, includes a diametrically enlarged externally threaded portion 64 within which both the outlet passage 60 and enlarged bore portion 58 extends. The control outlet member 20 terminates axially inwardly of the gauge 10 in a chamber pressure control portion 66. The portion 66 includes a reduced diameter portion 68 which seats a fluid sealing member 70 separating the chamber 36 from the enlarged bore portion 58. The section 68 also provides a seat for one end of a pressure regulating spring 72. Also mounted on the external surface of the control portion 66 is an annular seat for a pressure sealing O-ring member 74 which engages the internal surface of a cage member 76.

The cage member 76 is provided for the purpose of threadedly receiving the control member 20 in fluid tight relation to the tubular shell member 12. Accordingly, the cage member 76 includes an internally threaded portion 78 and an annular seat for an O-ring member 80 which engages the internal surface of the shell member 12 for completing the sealing of the control pressure member 36 within the tubular shell member 12. Also, the cage member 76 mounts or is connected to the pointer member 24 which extends axially outward from the shell member 12 through a cage locking slot 82 as more clearly seen in FIGURE 3. The cage member 78 is thereby prevented from rotation relative to the shell member 12 so that rotational movement of the control outlet member 20 by means of the control knob 22 will cause it to be axially adjusted with respect to the cage member 78 and the shell member 12.

In the position illustrated in FIGURE 1, the outlet passage 60 from the gauge 10 is in fluid communication with the control pressure chamber 36 through the enlarged bore portion 58, the outlet port 50, the passage 56 within the tube 44, and the chamber port 48. The inlet passage 40 however, as shown in FIGURE 1 is not in communication with the control pressure chamber 36 by virtue of the illustrated position of an inlet control device generally referred to by reference numeral 84. The control device 84 includes a control piston sleeve 86 which is slidably mounted on the outlet passage tube 44 adjacent the pressure inlet stem 14. A spring reacting flange 88 is therefore formed on the control sleeve 86 against which the pressure regulating spring 72 reacts in order to bias the control sleeve 86 toward the position illustrated in FIGURE 1. The control sleeve is therefore seated against a resilient sealing gasket 90 which is mounted on the flange portion 34 of the inlet stem constituting a sealing seat for the abutting end of the control piston sleeve 86. The abutting end of the control sleeve is therefore formed with an internally tapered bore 92, exposing the inlet port 46 and thereby forming a reacting surface for inlet fluid pressure by means of which the control piston sleeve 86 may be slidably displaced against the bias of the pressure regulating spring 72 from the sealing seat 90. The length of the control sleeve 86 is such however, that when it is axially displaced from its seat 90 as illustrated in FIGURE 2, the chamber port 48 will be covered so as to block fluid communication between the passage 56 and the chamber 36 while the port 46 provides communication between the inlet passage 40 and the chamber 36.

From the foregoing description, operation of the pressure inflation gauge 10 will become apparent. The outlet control member 20 may be axially adjusted for a desired inflation pressure by rotation of the control knob 22 to a particular setting whereby the pressure regulating spring 72 may be loaded to a predetermined extent by virtue of the spacing of the spring mounting section 68 from the inlet end of the shell member 12. When the inlet pressure is connected to the inlet stem 14, it will react against the counterbore surface 92 of the control sleeve 86, causing displacement thereof against the bias of spring 72 as illustrated in FIGURE 2. The fluid will therefore commence to fill the chamber 36 rapidly increasing the pressure thereof. Inasmuch as the chamber port 48 is closed when the inlet port 46 is opened, there is a rapid increase of pressure in the control chamber 36 without it being communicated to the outlet passage 60 which is at a lower tire inflation pressure, prior to the increase in inflation pressure to be effected. The pressure control spring 72 will therefore immediately seat the control sleeve 86 when the pressure in the chamber 36 has risen to a predetermined value. Upon closing of the inlet portion 46 by the control sleeve 86, the increased pressure fluid in the chamber 36 will be admitted through the chamber port 48 to the outlet passage 60 for increasing the inflation pressure of the tire to which the passage 60 is connected. As soon as the pressure in the chamber 36 reduces in value to the resulting increased inflation pressure in the outlet passage 60, the inlet pressure in passage 40 again causes opening of the inlet port 46 by displacement of the piston sleeve 86 against the bias of spring 72 also closing the chamber port 48 to once again increase the pressure of the chamber 36 to its predetermined value as defined by the preset loading of the spring 72 by the setting of the outlet control member 20. Accordingly, the inflation pressure of the tire is again increased. The cycle is therefore repeated until the inflation pressure in the outlet passage 60 equals the pressure to which chamber 36 is increased before the spring 72 seats the control sleeve. This will be the inflation pressure value for which the control outlet member 20 has been set. Accordingly, the pressure reading indicia 26 will be properly calibrated for such purpose.

It will be further apparent, that as the loading of the pressure regulating spring 72 is changed by axial adjustment of the outlet control member 20, the volume of the pressure control chamber 36 is also varied, by axial movement of the chamber sealing members 70 and 74. Accordingly, the volume of the pressure control chamber 36 is increased with an increase in the inflation pressure to be obtained. With the increased volume of the chamber 36 a more rapid supply of fluid is made possible in order to meet the increased demands. Furthermore, when the inflation pressure is to be increased to the maximum value which may be the value of the air pressure from the supply tank, the pressure control outlet member 20 may be positioned so that the section 68 thereof will be in the position as illustrated in FIGURE 3 bringing the outlet port 50 into direct fluid communication with the control pressure chamber 36. Accordingly, the inlet passage 40 will be in direct communication with the outlet passage 60 as long as the inlet pressure exceeds that of the inflation pressure. A direct and continuous fluid connection is therefore established by the limit setting of the control outlet member 20.

What is claimed as new is as follows:

1. A pressure inflation gauge through which fluid is delivered to an outlet comprising, pressure chamber means, inlet means operatively connected to the chamber means operative to admit fluid thereto in response to an inlet pressure in excess of a predetermined value, outlet means operatively connected to the chamber means for delivery of fluid to said outlet and operative in response to admission of fluid by the inlet means to interrupt fluid communication with the outlet, pressure regulating means operatively connected to the inlet means to prevent operation of the inlet means and outlet means below said predetermined pressure value, and adjusting means on the outlet means to render the pressure regulating means ineffective to interrupt fluid communication to the outlet in one position of the adjusting means.

2. A pressure inflation gauge through which fluid is delivered to an outlet comprising, pressure chamber means, inlet means operatively connected to the chamber means operative to admit fluid thereto in response to an inlet pressure in excess of a predetermined value, outlet means operatively connected to the chamber means for delivery of fluid to said outlet and operative in response to admission of fluid by the inlet means to interrupt fluid communication with the outlet, pressure regulating means operatively connected to the inlet means to prevent operation of the inlet means and outlet means below said predetermined pressure value, and adjusting means on the outlet means to render the pressure regulating means ineffective to interrupt fluid communication to the outlet in one position of the adjusting means, said outlet means comprising fixed passage means mounted within the chamber means and extending into the inlet means and outlet, said passage means having inlet, chamber and outlet ports communicating with the inlet means, chamber means and outlet respectively and fixed passage blocking means disposed in the passage means to prevent fluid communication between the inlet and chamber ports.

3. The combination of claim 2 wherein said pressure regulating means comprises, adjustable mounting means connected to the outlet and movably mounted in the chamber means for varying the volume thereof and biasing means mounted on the adjustable mounting means and reacting between the inlet means and adjustable mounting means for biasing the inlet means to a closed position, the adjustable mounting means being adjustably movable to said one position of the pressure regulating means to bring the outlet port of the outlet means into communication with the chamber means.

4. The combination of claim 3, wherein said inlet means comprises, an inlet passage means connected to the outlet means in fluid communication with the chamber means, sealing means mounted on the inlet passage means, and piston means slidably mounted on the outlet means and biased into engagement with the sealing means for blocking the fluid communication between the chamber means and inlet passage means.

5. The combination of claim 4, wherein said chamber means comprises a tubular member mounting the inlet means and outlet means at one end thereof, cage means slidably received by the tubular member at the other end thereof for adjustably mounting the pressure regulating means and seal means located within the tubular member and operatively disposed between the cage means and the tubular member, cage means and pressure regulating means and between the pressure regulating means and outlet means.

6. The combination of claim 5, including pressure indicating means comprising indicia means mounted on the pressure regulating means and indicating pointer means connected to the chamber means and extending therefrom into coperative relation to the indicia means.

7. A pressure inflation gauge through which fluid is delivered to an outlet comprising, pressure chamber means, inlet means operatively connected to the chamber means operative to admit fluid thereto in response to an inlet pressure in excess of a predetermined value, outlet means operatively connected to the chamber means for delivery of fluid to said outlet and operative in response to admission of fluid by the inlet means to interrupt fluid communication with the outlet and pressure regulating means operatively connected to the inlet means to prevent operation of the inlet means and outlet means below said predetermined pressure value, said outlet means comprising fixed passage means mounted within the chamber means and extending into the inlet means and outlet, said passage means having inlet, chamber and outlet ports communicating with the inlet means, chamber means and outlet respectively and fixed passage blocking means disposed in the passage means to prevent fluid communication between the inlet and chamber ports.

8. The combination of claim 7 wherein said pressure regulating means comprises, adjustable mounting means connected to the outlet and movably mounted in the chamber means for varying the volume thereof and biasing means mounted on the adjustable mounting means and reacting between the inlet means and adjustable mounting means for biasing the inlet means to a closed position, the adjustable mounting means being adjustably movable to one position of the pressure regulating means to bring the outlet port of the outlet means into communication with the chamber means.

9. The combination of claim 8, including pressure indicating means comprising indicia means mounted on the adjustable mounting means indicating pointer means connected to the chamber means and extending therefrom into cooperative relation to the indicia means.

10. A pressure inflation gauge through which fluid is delivered to an outlet comprising, pressure chamber means, inlet means operatively connected to the chamber means operative to admit fluid thereto in response to an inlet pressure in excess of a predetermined value, outlet means operatively connected to the chamber means for delivery of fluid to said outlet and operative in response to admission of fluid by the inlet means to interrupt fluid communication with the outlet and pressure regulating means operatively connected to the inlet means to prevent operation of the inlet means and outlet means below said predetermined pressure value, said chamber means comprising a tubular member mounting the inlet means and outlet means at one end thereof, cage means slidably received by the tubular member at the other end thereof for adjustably mounting the pressure regulating means and seal means located within the tubular member and operatively disposed between the cage means and the tubular member, cage means and pressure regulating means and between the pressure regulating means and outlet means.

11. The combination of claim 10, including pressure indicating means comprising indicia means mounted on the pressure regulating means and indicating pointer means connected to the cage means and extending therefrom into cooperative relation to the indicia means.

12. A pressure inflation gauge through which fluid is delivered to an outlet comprising, pressure chamber means, inlet means operatively connected to the chamber means operative to admit fluid thereto in response to an inlet pressure in excess of a predetermined value, outlet means operatively connected to the chamber means for delivery of fluid to said outlet and operative in response to admission of fluid by the inlet means to interrupt fluid communication with the outlet and pressure regulating means operatively connected to the inlet means to prevent operation of the inlet means and outlet means below said predetermined pressure value, said inlet means comprising, an inlet passage means connected to the outlet means in fluid communication with the chamber means, sealing means mounted on the inlet passage means, and piston means slidably mounted on the outlet means and biased into engagement with the sealing means for blocking the fluid communication between the chamber means and inlet passage means.

13. A pressure inflation gauge comprising, a tubular shell, a pressure inlet stem mounted at one end of the shell in fluid tight relation thereto, an outlet passage tube connected to the inlet stem having inlet, chamber and outlet ports and extending axially into the shell, a cage member slidably received at the other end of the shell extending coaxially about the outlet passage tube, a pressure regulating outlet member threadedly received within the cage member for axial adjustment with respect thereto, chamber pressure control means connected to the outlet member in coaxial and in fluid sealing relation to the outlet passage tube and cage member axially between the chamber and outlet ports, a resilient sealing seat mounted on the inlet stem within the shell, a control piston sleeve slidably mounted on the outlet passage tube, spring means mounted on the piston sleeve and chamber pressure control means for reacting therebetween to bias one end of the piston sleeve against the sealing seat, said one end of the piston sleeve being counterbored for exposing the inlet port and a passage block member mounted in the outlet passage tube between the inlet and chamber ports.

14. The combination of claim 13, including pressure indicating indicia mounted on the pressure regulating outlet member and pointer means connected to the cage member extending axially outwardly from the tubular shell through a locking slot into cooperative relation to the indicia for indicating adjustable positions of the pressure regulating outlet member relative to the tubular shell and outlet passage tube including one limit position in which the inlet, chamber and outlet ports are positioned on one side of the chamber pressure control means.

References Cited in the file of this patent

UNITED STATES PATENTS

| | | |
|---|---|---|
| 2,067,882 | Allessi | Jan. 19, 1937 |
| 2,702,044 | Johnston | Feb. 15, 1955 |
| 2,791,233 | Anderson | May 7, 1957 |